(12) United States Patent
Begeja et al.

(10) Patent No.: US 7,231,023 B1
(45) Date of Patent: **\*Jun. 12, 2007**

(54) NETWORK ACCESS WITH DELAYED DELIVERY

(75) Inventors: Lee Begeja, Gillette, NJ (US); John A. Rotondo, Murray Hill, NJ (US)

(73) Assignee: AT&T Corp., New York, NY (US)

( \* ) Notice: Subject to any disclaimer, the term of this patent is extended or adjusted under 35 U.S.C. 154(b) by 1334 days.

This patent is subject to a terminal disclaimer.

(21) Appl. No.: 09/840,091

(22) Filed: Apr. 24, 2001

Related U.S. Application Data (63) Continuation-in-part of application No. 09/185,049, filed on Nov. 3, 1998, now Pat. No. 6,243,445.

(51) Int. Cl.
*H04M 11/00* (2006.01)

(52) U.S. Cl. .............................. 379/93.01; 379/93.25; 370/352

(58) Field of Classification Search ............ 379/90.01, 379/93.01, 93.05, 100.11, 88.17, 88.18, 88.01, 379/88.04, 88.13, 88.12, 88.15, 93.26, 93.15; 370/352, 353, 354, 356; 704/270; 709/200, 709/217, 218, 219; 707/10
See application file for complete search history.

(56) References Cited

U.S. PATENT DOCUMENTS

| | | | |
|---|---|---|---|
| 5,884,262 A | \* | 3/1999 | Wise et al. ............... 704/270.1 |
| 5,915,001 A | | 6/1999 | Uppaluru |
| 5,953,392 A | | 9/1999 | Rhie et al. |
| 5,995,597 A | \* | 11/1999 | Woltz et al. ............. 379/93.24 |
| 6,049,596 A | | 4/2000 | Dumaine et al. |

\* cited by examiner

*Primary Examiner*—Melur Ramakrishnaiah (57) ABSTRACT

This invention provides a network access system that permits communication device users to access a network such as the Internet, a cable network, a Digital Subscriber Line (DSL) network or a broadband network (which may include cable and DSL networks). A network access device receives commands from users and executes the commands such as send e-mail, search the network, log on to pages supported by other parties on the network, download information from the network, request information such as movies from the network, bidding in an auction, etc. A user profile saves preferences of a user for interacting with the network. The network access device may supply primitive commands for the user to use individually or to construct complex command macros so that by a single command, more complex functions may be performed using the network. By the above described techniques, users who do not have access to devices such as a personal computer may access the network and take advantage of the rich resources available through the network.

15 Claims, 12 Drawing Sheets

| SOURCE 303 | FUNCTIONS 305 |
|---|---|
| E-MAIL | CONVERT TO VOICE AND PLACE IN VOICE MAILBOX |
| PAGE | RECORD NUMBER OF HITS PER DAY |
|  | UPDATE GUEST DATABASE |
|  | OUTPUT WEEKLY BY FACSIMILE TO 1-286-312-5782 |

| NAME 307 | ADDRESS 309 |
|---|---|
| JOE | JOE@EROLS.COM |
| KAREN | KAREN@ATT.COM |
| TENNIS | LEE@AOL.COM |
|  | ANDREW@PICKINGS.ORG |
|  | CHERRY@CORNWELL.EDU |

| VOICE COMMAND 312 | FUNCTION 314 |
|---|---|
| SKIP | IGNORE CURRENT ITEM; GO ON TO NEXT ITEM |
| FASTER | INCREASE SPEED OF OUTPUT SPEECH |
| SLOWER | DECREASE SPEED OF OUTPUT SPEECH |
| REPEAT | REPEAT LAST ITEM |
| FIND <WORD> | SEARCH FOR <WORD> |
| GOTO <NAME> | ACCESS A PAGE IMMEDIATELY, FOR EXAMPLE |
| SEARCH <DATA> | NETWORK SEARCH FOR <DATA> |
| BOOKMARK <NAME> | SAVE CURRENT URL AS <NAME> |
| PRINT | PRINT CURRENT ITEM AND PUT IN MAIL |
| FAX | SEND IMAGE OF CURRENT ITEM BY FACSIMILE |
| DICTATE | CONVERT VOICE TO TEXT |
| ... | ... |

| KEY 316 | FUNCTION 318 |
|---|---|
| "2" | UP |
| "5" | DOWN |
| "4" | LEFT |
| "6" | RIGHT |
| "0" | REPEAT |
| "*3"<WORD> | FIND <WORD> WHERE WORD IS <1,2,3> <1-9> |
| "*7"<DATA> | SEARCH <DATA> WHERE WORD IS <1,2,3> <1-9> AND "0" IS SPACE |
| ... | ... |

*FIG. 6*

DATA RETURN PREFERENCES

TELEPHONE CALL

FACSIMILE

PAGER MESSAGE

VOICE MAILBOX

NETWORK ACCESS WITH DELAYED DELIVERY

This is a Continuation-in-Part of application Ser. No. 09/185,049 filed Nov. 3, 1998 now U.S. Pat. No. 6,243,445.

BACKGROUND OF THE INVENTION

1. Field of Invention

This invention relates to accessing networks by using communication devices.

2. Description of Related Art

Networks such as the Internet have gained widespread acceptance as a desirable communication medium as well as a source of information. Conventionally, networks are accessed via devices such as personal computers. Such devices provide visual outputs through a video display and data entry through a keyboard, for example. However, personal computers are not always available in accessing the network. Thus, new technology is needed to make available the network in such circumstances.

SUMMARY OF THE INVENTION

A network access system is provided that permits access to a network such as the Internet, a cable network, Digital Subscriber Line (DSL) network or broadband networks (which may include cable and DSL networks) using any communication device. Users may gain access to a network by issuing commands to a network access device. After logging onto the network, the user may issue commands via the network access device to send e-mail, search the network, log on to pages supported by other parties on the network, or download information as would be done by a person using a personal computer. However, due to factors such as limitations of the communications device used by the user or other factors such as convenience, responses from the network is not desired immediately but delayed to a later time and perhaps using a different communications device.

The network access device provides commands to the user to easily navigate the network or pages supported by the network. For example, commands may be find, search, skip, or repeat. For voice communication systems, such as wired/wireless phones, the network access device converts voice commands of a caller into text by voice to text conversion and executes the commands. The responses from the network may be converted from text to voice by speech synthesis, for example, and the voice signals output to the caller through the telephone network and the users voice communication device.

The network access device provides a profile for a user where the user may save preferences for interacting with the network. For example, the user may establish outbound mail directories where a label may be associated with an e-mail address so that the user may simply command "send e-mail to Lee" (via voice or signal key) and instruct the network access device to receive input from the user and send it as a message to an e-mail address corresponding to the label "Lee". In addition, the network access device may supply primitive commands for the user to use individually or construct more complex command macros so that by a single command, more complex functions may be performed using the network.

Further, if responses are to be delivered to the user at a later time because of inconvenience or for reasons such as search delays due to network congestion or requested by the user, then the network access device may either delay information delivery or store the information in a database and contact the user based on information stored in the user's profile.

By the above described techniques, users who have access to devices such as a pager, a personal digital assistant (PDA) (wired or wireless), a wired/wireless phone (e.g., Wireless Application Protocol (WAP), I-mode, etc.), an interactive television (iTV), etc., set-top box, home gateway, wireless internet device, etc., may access the network and take advantage of the rich resources available through the network. For example, users may be traveling and not have access to a personal computer but wish to retrieve information from the network. In such circumstances, the network access device provides users the ability to interface with the network.

BRIEF DESCRIPTION OF THE DRAWINGS

The invention is described in connection with the following figures wherein like numerals represent like elements, and wherein.

DETAILED DESCRIPTION OF PREFERRED EMBODIMENTS

Figure 1:
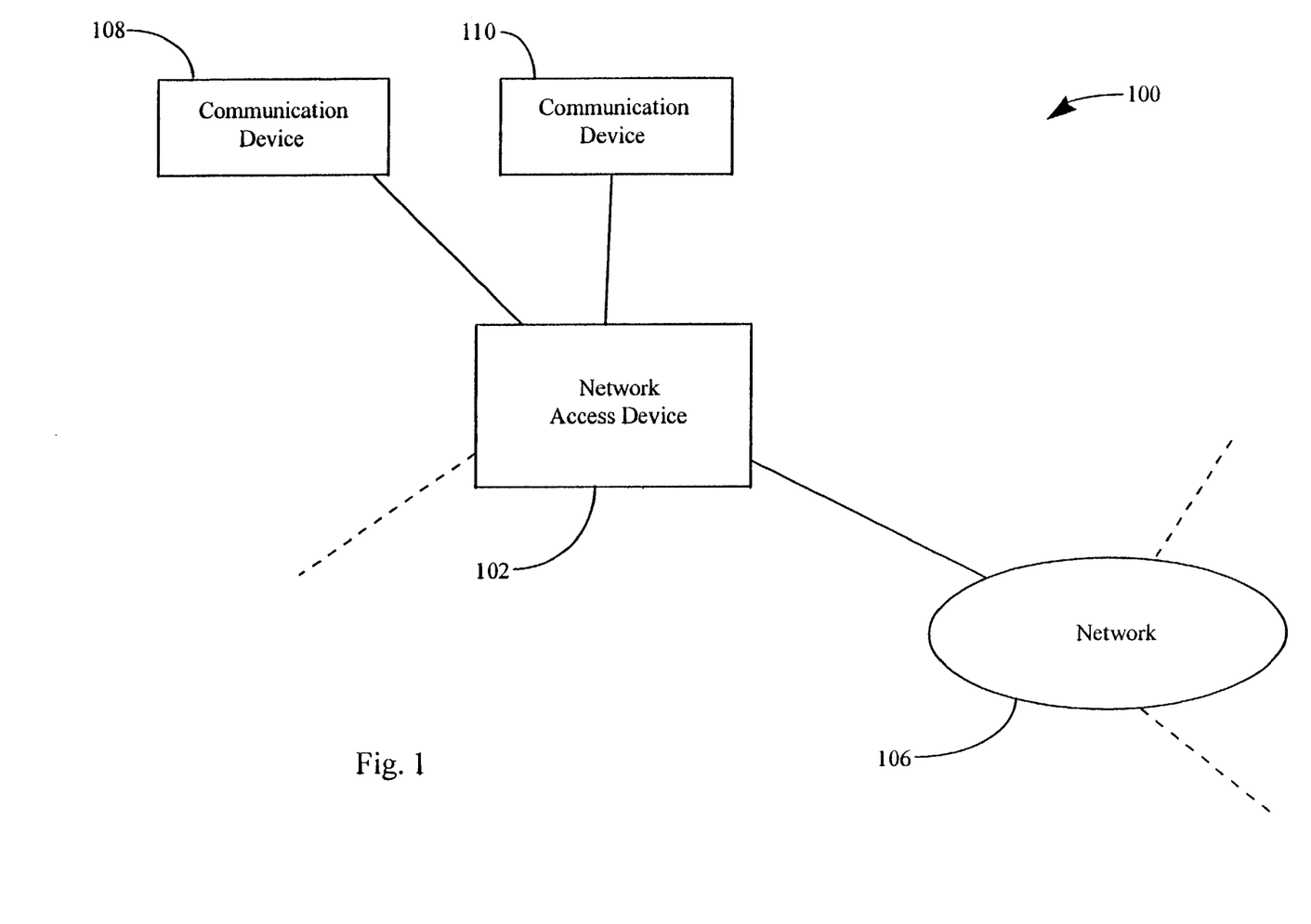
FIG. 1 is a diagram of a network access system.

FIG. 1 shows a network access system 100 that includes one or more communication devices 108–110 coupled to a network access device 102 and a network 106. The communication devices 108–110 may be wired or wireless and may include cellphones, cable telephony devices, and/or fixed wireless devices, for example. The network 106 may be the Internet or a cable network, for example.

The network 106 may be reached via other networks such as telephone networks or cable networks, Digital Subscriber Line (DSL) network or broadband networks (which may include cable and DSL networks), for example. In these cases, the network access device 102 may be connected to the network 106 using these other networks as a link or is connected to the network 106 directly and the communication device 108–110 reach the network access device 102 via these other networks.

The communication devices 108–110 may be any communication device such as pagers, personal digital assistants (PDA) (wired or wireless), a wired/wireless phone (e.g., Wireless Application Protocol (WAP), I-mode, etc.), an interactive television (iTV), etc., set-top box, home gateway, wireless internet device, etc. The communication device may not necessarily be two-way communication devices. For example, a transmitter that can transmit a command to the network access device 102 is sufficient.

When access to the network 106 is desired, the user may dial an 800 number when using a telephone network or by making a selection using an iTV via a cable network, a Digital Subscriber Line (DSL) network or a broadband network (which may include cable and DSL networks), for example. If the user is a subscriber, the network access device 102 retrieves a profile of the user and performs any initial setup that may be required such as logging on the network 106 using an identification that is associated with the user.

If the user is not a subscriber, the network access device 102 may send a message to the user offering network access services and requesting an account number (e.g., a calling card number, a telephone account number, an internet account number, etc.) to which the services may be billed. After receiving the required numbers, the network access device 102 interacts with the user to determine what services the user may wish to use. For example, the non-subscriber user may request that the network access device 102 to set up a user ID which may be used to receive e-mail, a page on the network 106, or to log on to the network 106.

Assuming that the user (subscriber or non-subscriber) desires to log on to the network 106, the network access device 102 acts as an interface for the user to the network 106. Various commands either via voice, via keypad entry, or via icon selection using iTV, etc., for example, are provided for the user so that the user may perform all the functions available on the network 106. For example, the user may wish to send e-mail to other parties. In this case, the user may issue an input command, possibly voice, by keypad, or icon selection, "send e-mail to begeja@att.com". The network access device 102 may respond by requesting a message that the user desires to send. When the message is received, the network access device 102 sends the e-mail to the e-mail address as instructed by the user.

The user may desire to review e-mail and issue a voice, keypad or icon command "get-mail". In this case, the network access device 102 checks the mailbox and outputs a message to the user either indicating that no mail was found or providing a list of the mail that was found. The network access device 102 may provide the list by using speech synthesis to generate speech indicating the titles of each of the e-mail messages and the e-mail addresses from which the e-mail was sent. Other convenient features might be providing a number, a name such as "susan", content such as "budget for each of the e-mail messages or, an appropriate icon such as an envelope so that the user may choose one of the e-mail messages to open. Thus, after receiving the list of e-mail messages, the user may say "open 3", "susan", or "budget" indicating the desire to open the third e-mail message or the message associated with "susan" or "budget", for example. The user may also use the keypad of a voice communication device and simply press "3" to direct the network access device 102 to open the third e-mail message or select an icon within the list.

When the network access device 102 receives the "open 3" command, the third e-mail message is opened and the network access device 102 may read the e-mail to the user via speech synthesis, display the message. The user may explicitly specify the "open 3" command in the user profile to deliver the message at a later time. The user may use additional commands such as "repeat", "skip", "back", etc.

The network access device 102 may support other commands that ease navigation through e-mail messages when using communication devices 108–110 that have limited capabilities, for example. Again, the user may also use a communication device keypad to issue any of the commands to navigate through the e-mail message or icons displayed by the communication device.

Similar to the above, the user may perform other functions available on the network 106. For example, the user may choose to query the network 106 using one of the available search engines to obtain a query result and then navigate through the query result to identify a particular network site to access and to navigate. The user may send messages to any of the accessed pages, participate in a chat room where, for example, voice to text and text to voice conversions link the user using a voice communication device with other chat room participants using text terminals, or send queries to user nets. User nets are standing forums in which questions may be asked and answers may be received from other parties participating in the forum. Responses may be received from any of the above actions and the network access device 102 may report the responses to the user either immediately or at a later time after the responses are collected.

Figure 13:
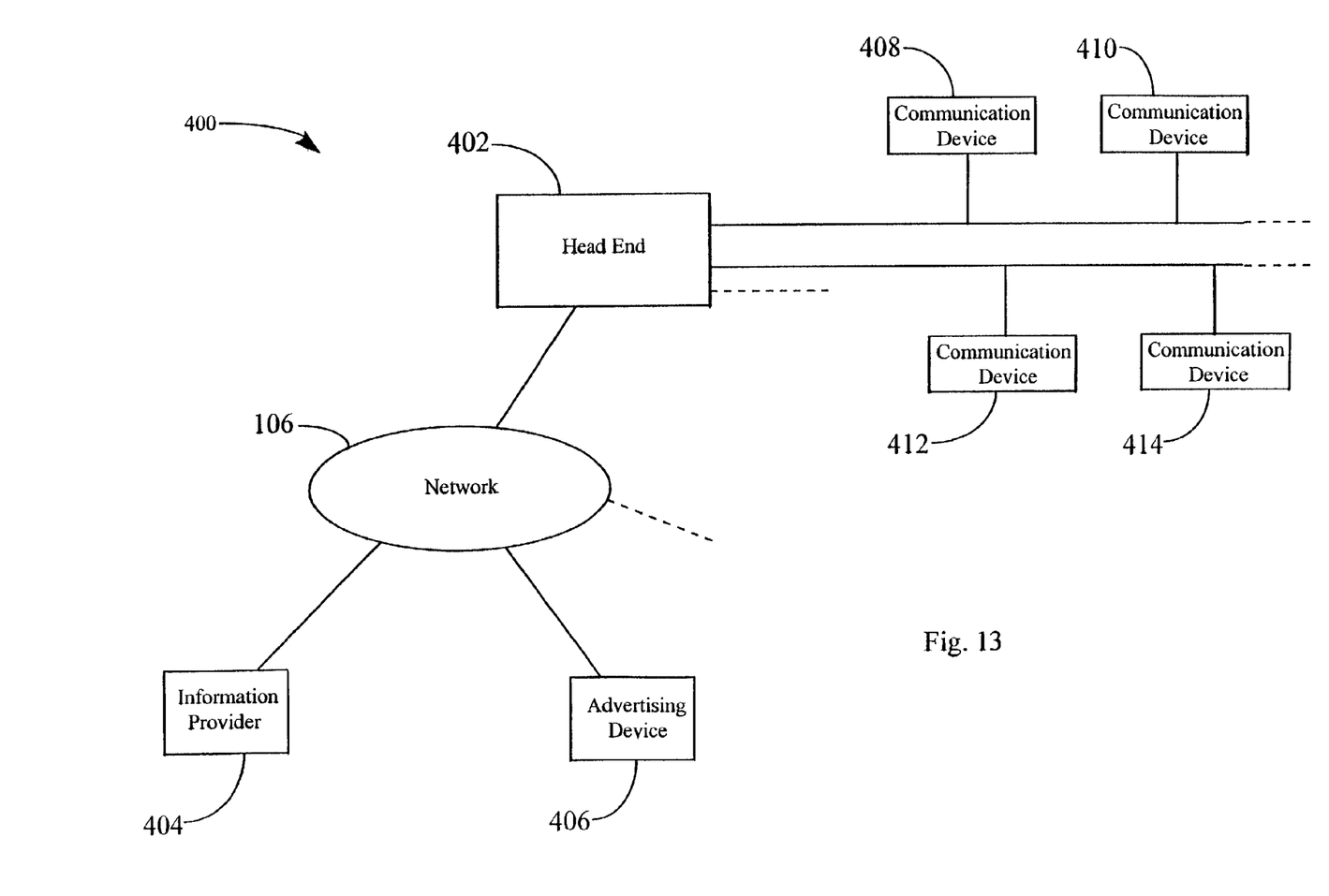
FIG. 13 shows a network access system that includes a cable system.

If the network 106 is a cable network, the network access device 102 may be a head-end 402 as shown in FIG. 13. The network 106 may be other types of networks such as DSL or broadband, for example. In these other networks the network access device 102 corresponds to a controller that receives and processes communications from users for those networks. The communication devices 408–412 may be devices such as (PDAs) (wired or wireless), wired/wireless phones (e.g., Wireless Application Protocol (WAP), I-mode, etc.), interactive televisions (iTV), etc., set-top boxes, home gateways, wireless internet devices, etc. Other types of devices may be connected to the network 106 such as information provider 404 and advertising device 406. In this environment, selection icons may be displayed on the iTV display overlaying a movie or advertisement being played, for example. Users (i.e., persons watching the movie or advertisement) may select an icon to request more information or to place an order for item(s) associated with the selected icon.

When icons are selected by the users, the head-end 402 may respond immediately and complete any information delivery or purchase transaction. However, interrupting a movie or advertisement may be inconvenient or undesirable for the users. Thus, the users may instruct the head-end 402 in the user profiles to deliver the requested information or complete the requested transaction at a later time.

This "delayed delivery" of information may also be used in other situations such as shopping, for example. When something of interest is spotted, the user may enter item identification such as the bar code into a communication device that can transmit the entered information to the network access device 102. The network access device 102 may collect the requested information from appropriate sources (e.g., manufactures, distributors or advertisers) and deliver the requested information to a designated device specified by the user profile. Thus, a shopper may enter may item identifications and have the information delivered to a home facsimile machine later during the day when all the shopping is done. In this way, information for all interested items discovered in one shopping trip may be delivered at once for more careful consideration.

The user may engage in auctioning activity, for example. Using a transmitting device, the user may enter bids to auctioning sites such as e-bay, for example. When available, the result of the auction may be sent to a designated device at a later time.

If the responses are to be reported to the user at a later time, the network access device 102 stores the results in a database and contacts the user based on a user profile. For example, the user profile may indicate that the reports should be sent to the user by facsimile at a specific facsimile number. The user may also specify that when the reports arrive, the network access device 102 should inform the user via a page at, for example, a specified pager number or initiate a telephone call to the caller so that the user may access the network access device 102 to review the results of the prior network actions.

Figure 2:
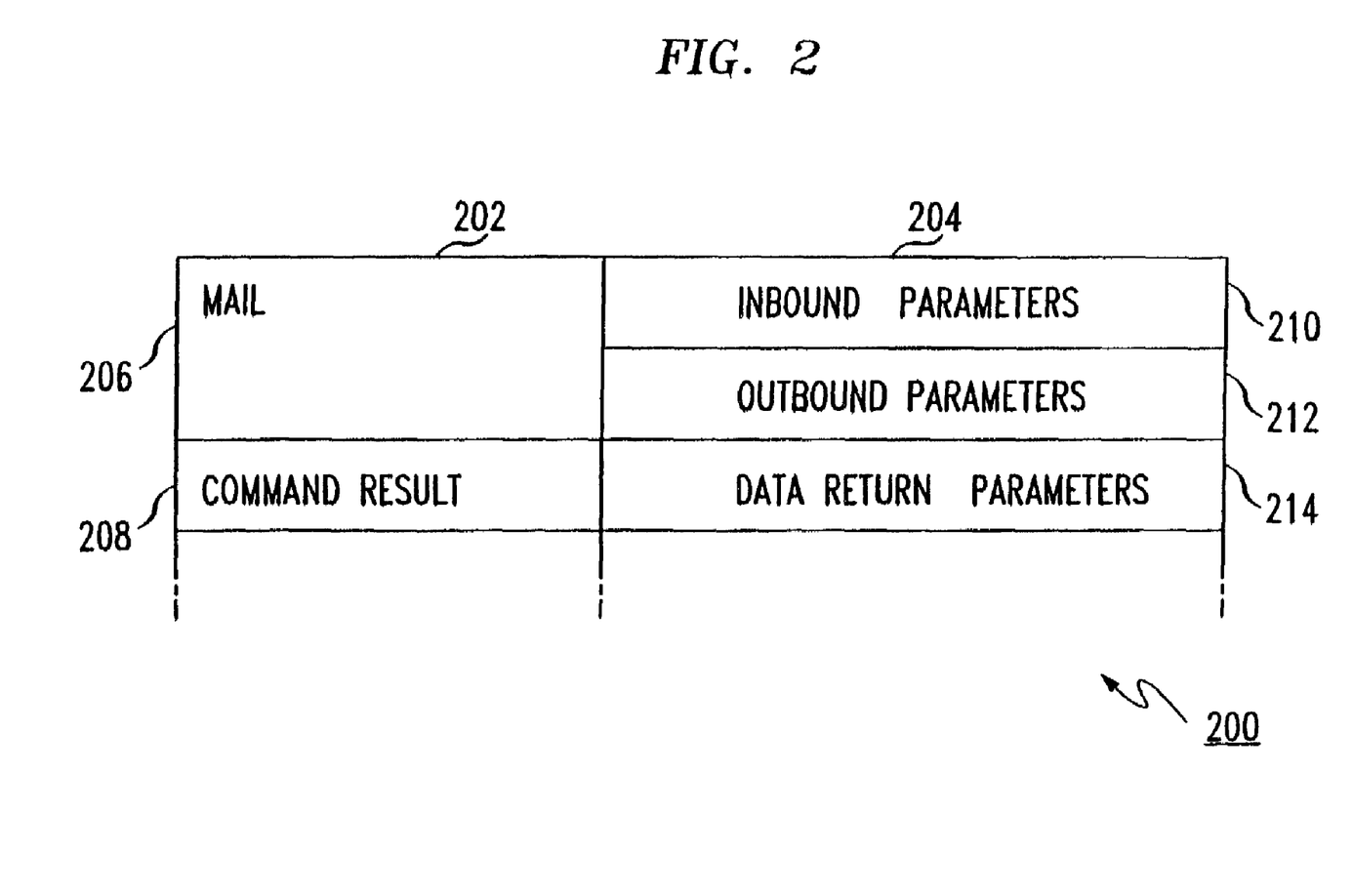
FIG. 2 shows an overview diagram of a user profile.

FIG. 2 shows an overview of an exemplary profile 200. The profile 200 includes an entry field 202 and a parameters field 204. For example, FIG. 2 shows a mail entry 206 and a command result entry 208. The mail entry 206 includes parameters 210 related to inbound mail and parameters 212 related to outbound mail and the command result entry 208 includes data return parameters 214.

Figure 3:
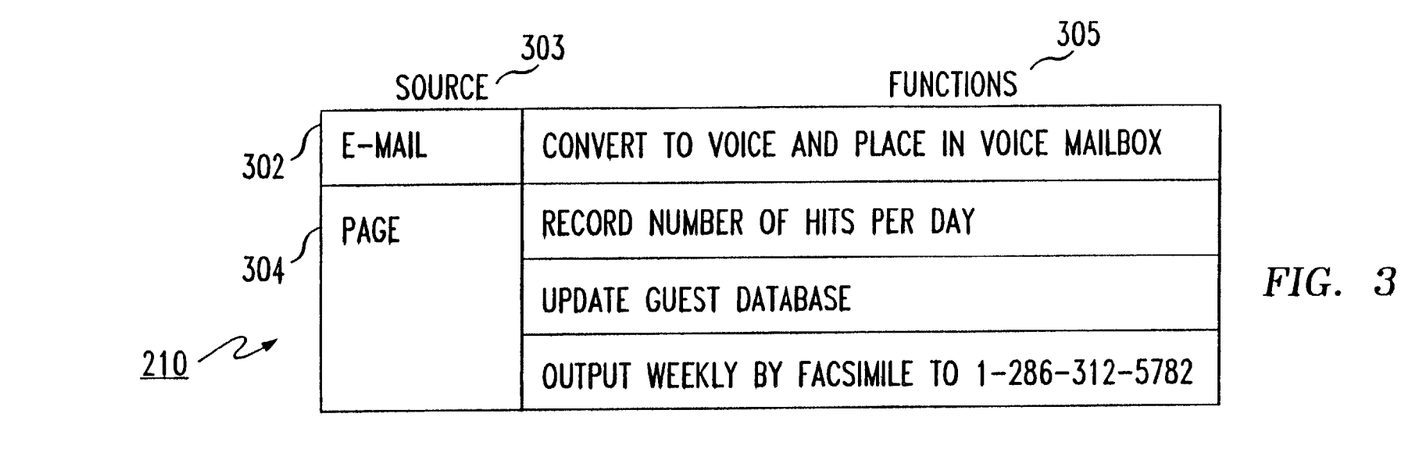
FIGS. 3 and 4 show inbound and outbound parameters of the user profile.

FIG. 3 shows an example of inbound mail parameters 210 which include an inbound mail source 303 and a corresponding functions field 305. For example, for e-mail 302, the profile 200 specifies to convert the e-mail to voice and place the e-mail in a voice mailbox. Other alternative functions may be performed such as only convert an e-mail Subject or Title to voice and place the converted text in the voice mailbox but leave the body of the e-mail unconverted until requested by the user. In this way, the user may save costs required to convert the message to voice.

The user may have requested the network access device 102 to set up a network page where other users of the network 106 may visit the user's page. Thus, a page entry 304 may specify functions such as to record the number of hits per day that is received by the page, to update a guest sign-in database of all those who hit the page and signed in as a guest, and to output the above recorded data weekly by facsimile to a specific facsimile telephone number as shown in FIG. 3.

Figure 4:
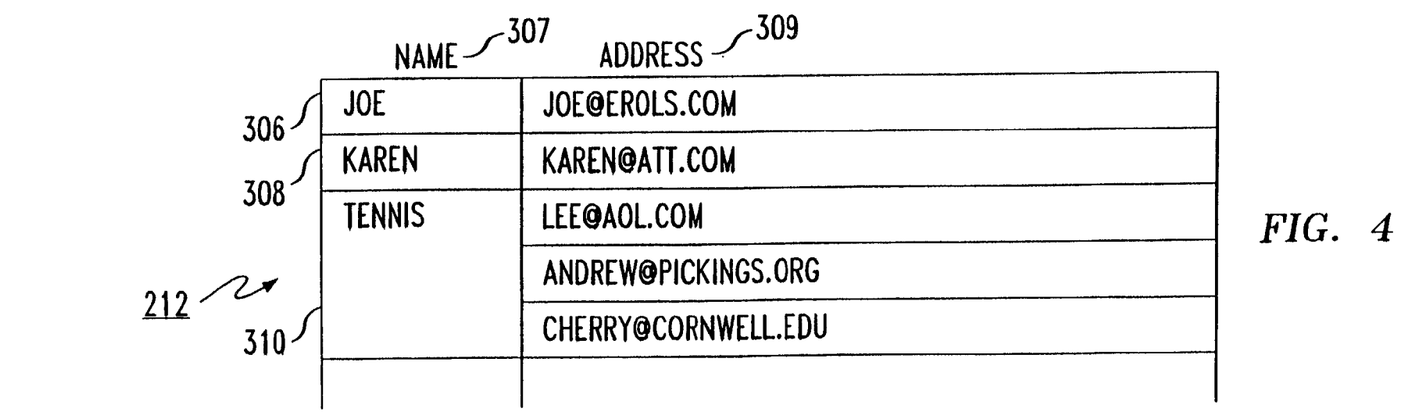

FIG. 4 shows an example of outbound mail parameters having a name field 307 and an address field 309. The name field 307 may contain voice or icon labels provided by the accessing party and the address field 309 may contain the e-mail address of the party, for example. Thus, entry 306 contains the label "Joe" and the e-mail address for Joe which is joe@erols.com. Similarly, the entry 308 may contain a label for "Karen" having the e-mail address karen@att.com. Entry 310 has a label for "tennis" which is a list of e-mail addresses such as lee@aol.com, andrew@pickings.org and cherry@cornell.edu, for example. Thus, the user may dictate or type using a keypad a message and direct the network access device 102 to send a message to a label which may be a single party or a list of parties.

Figure 5:
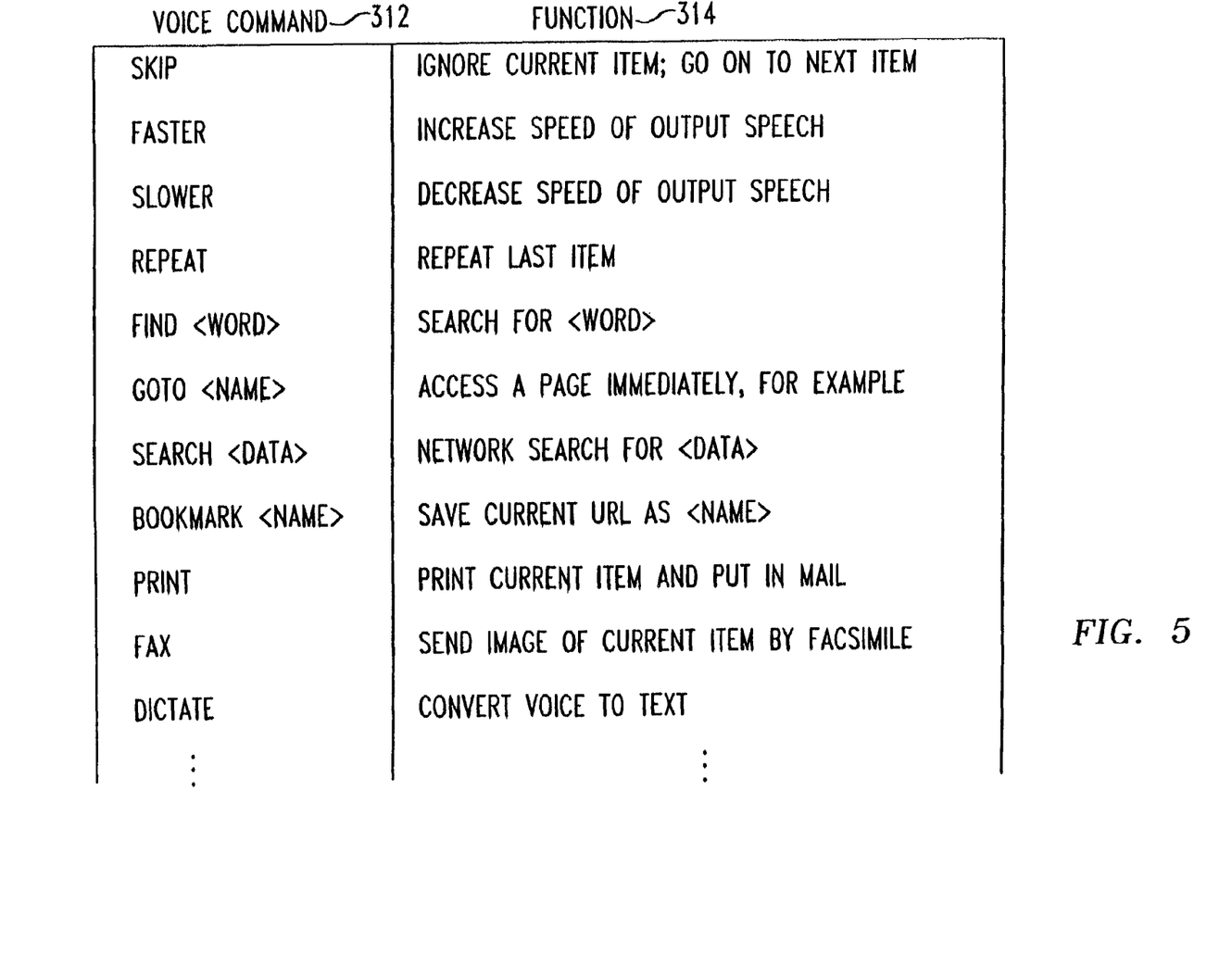
FIG. 5 shows input command parameters of the user profile.

FIG. 5 shows examples of possible voice commands in a command database (icon commands may be similarly provided). The command database 314 includes a command field 312 and a function field 314. The command field 312 may correspond to commands described below. The "skip" command may instruct the network access device 102 to ignore the current item and go on to the next item. For example, if the user is reviewing e-mail messages, and, after hearing or reading the first line of the message, decides to skip the e-mail message and go on to the next e-mail message, the user simply says "skip" or hits the skip icon and the network access device 102 skips the current e-mail message, opens the next e-mail message and begins to output for the next e-mail message.

When reviewing a list of items from a network search, the skip command may instruct the network access device 102 to skip a current item to a following item in the list. Thus, the skip command may be interpreted by the network access device 102 contextually. The accessing party may personalize the meaning of commands for each context in which they are used.

For example, the user may select a meaning of a command from a list of predefined meanings and a list of contexts provided by the network access device 102. The user may also change the label for a voice command or icon. For example, the user may change "skip" to "next" when used in the network search context.

The "faster" and "slower" commands permit the user to adjust the speed of data delivery from the network access device 102 according to the desire of the user. The "repeat" command instructs the network access device 102 to repeat the last item generated by the speech synthesis or icon display. For example, in the e-mail context, the repeat voice command may cause the network access device 102 to repeat the last word that was output to the user. The user may modify the repeat command to output the last phrase or the last sentence or the last five seconds of speech, for example.

The "find" command may direct the network access device 102 to search for a word such as "find karen". For example, the user may instruct the network access device 102 to search for a particular word in a long e-mail message such as "tennis". When navigating, the user may use the "find" command to search for a particular section of the page by providing a keyword. When the location of the search word is found, the network access device 102 may output the content of a line where the search word is found so that the user may determine the next action to take.

All of the above commands, voice and/or icon, relate to navigating text. The network access device 102 may also provide commands to "surf" the network 106. For example, the "go to" command directs the network access device 102 to immediately access a page, for example. Thus, "go to www.candy.com" causes the network access device 102 to access the specified page on the network. 106. The search command may instruct the network access device 102 to search the complete network 106 using a search engine that may be explicitly specified or specified by the user in the user profile. For example, the user may have specified the preferred search engine to be "YAHOO". In this case, the network access device 102 enters the search data as provided by the user for the YAHOO engine and reports the results of the search to the user.

The remaining commands shown in FIG. 5 are additional examples of possible commands that may be provided. The "bookmark" command updates a directory of network addresses with a current address visited by the user. Thus, when the user issues the bookmark command, such as "bookmark tennis", the address of a current site (or page) is placed in a directory having the label "tennis" indicated. The print command instructs the network access device 102 to print items being considered by the user. For example, if the user is reviewing an e-mail message, the "print" command makes a hard copy of the e-mail message. The user may specify either explicitly or in the profile whether to print to file, make a hard copy and mail it to the user, or send a copy by facsimile to the user at a designated facsimile number. The "fax" command directly instructs the network access device 102 to send a specified item by facsimile. The "dictate" command instructs the network access device 102 to convert the speech of the user into text and to save the text until a further command such as a "mail" command sends the text as an e-mail to parties specified in the outbound mail parameters.

The commands shown in FIG. 5 and discussed above are merely examples and not exhaustive. Many other voice and/or icon commands may also be provided to enhance the convenience of the user to manipulate items accessible through the network 106 such as for sorting e-mail messages or search results.

The user may construct new commands by instructing the network access device 102 to learn labels spoken or designed by the user and associate it with combinations of existing commands. For example, the user may combine the "go to" command with the "bookmark" command to create a "go mark" command. Thus, command macros may be generated by making combinations of existing commands. The network access device 102 may provide a large inventory of primitive commands which may be selected by the user to assign to a user-designated label or to be combined in a macro for a more complex command.

Figure 6:
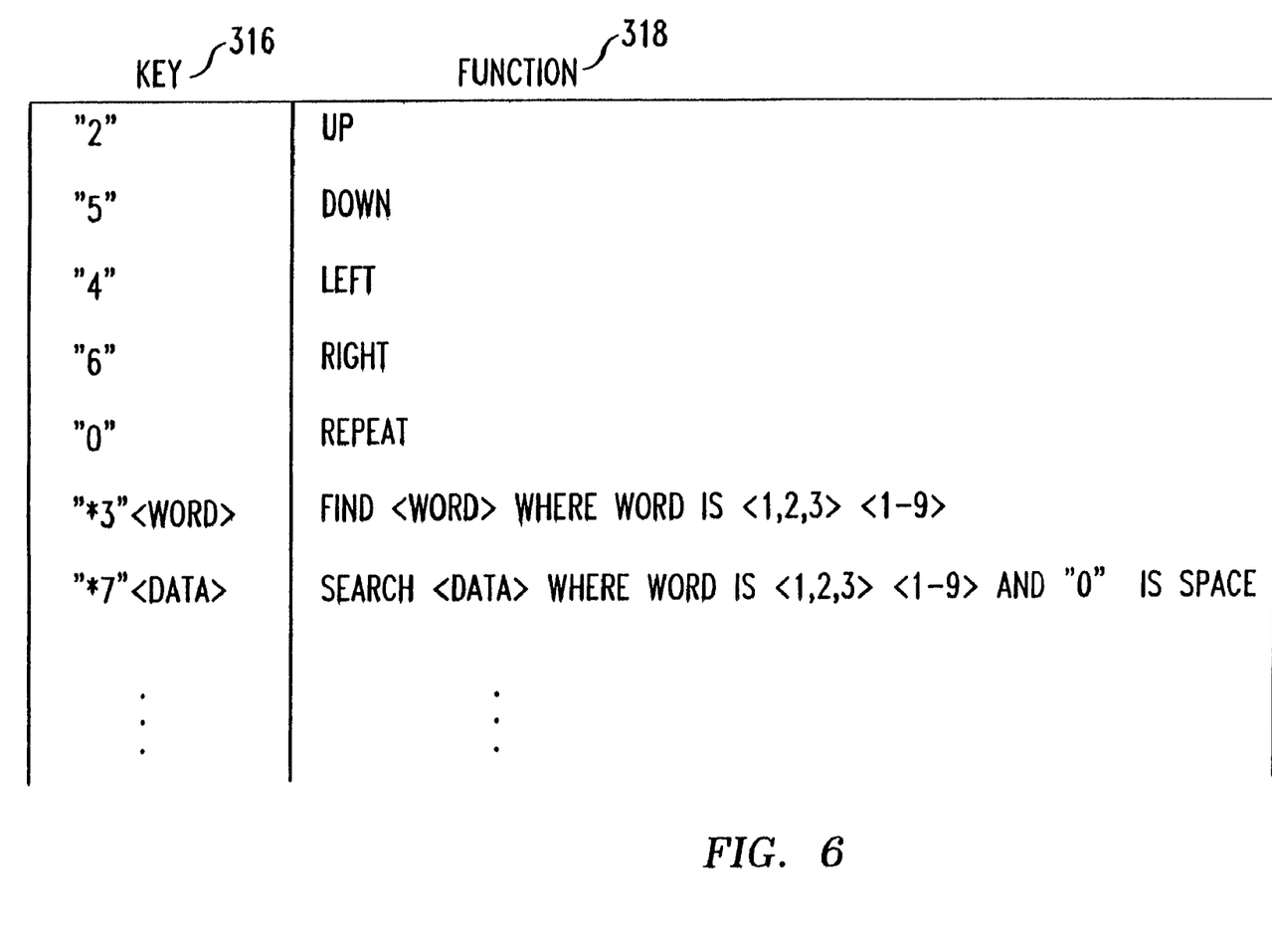
FIG. 6 shows the keypad command parameters.

The user may also specify keypad commands using a keypad that may be available on communication devices or displayed on a screen of an iTV, for example. FIG. 6 shows an example where the keys of the keypad corresponding to 2, 5, 4, 6 and 0 may be used as commands for "up", "down", "left", "right", and "repeat", respectively. For example, if the user is reviewing an e-mail message, and presses 2 on the keypad, then the network access device 102 may stop reading the current line and move up one line and begin reading the new line. Pressing 4 and 6 may cause the network access device 102 to read a word to the left of the current word or to the right of the current word, and pressing 0 may cause the network access device 102 to repeat a word, a line or a sentence as may be further specified by the user, for example.

More complex keypad commands may also be provided or constructed by the user such as "*3" or "*7", for example. The *3 keypad command may indicate that the following keypad entries define text that the network access device 102 should use as an operand for a prior voice command. For example, the "go to" voice command following by "*3" www.tennis.com" commands the network access device 102 to go to www.tennis.com. A single letter may be specified by pressing keys for 1, 2, or 3 followed by one of the other keys of a conventional keypad to select one of the letters. For example, "a" would be 1,2 and "k" would be 2,5. ** may represent a '.', for example. The same method may be used to enter data for a search command. As with voice and icon commands, the user may define other keypad commands by combining selected primitive commands offered by the network access device 102.

Figure 7:
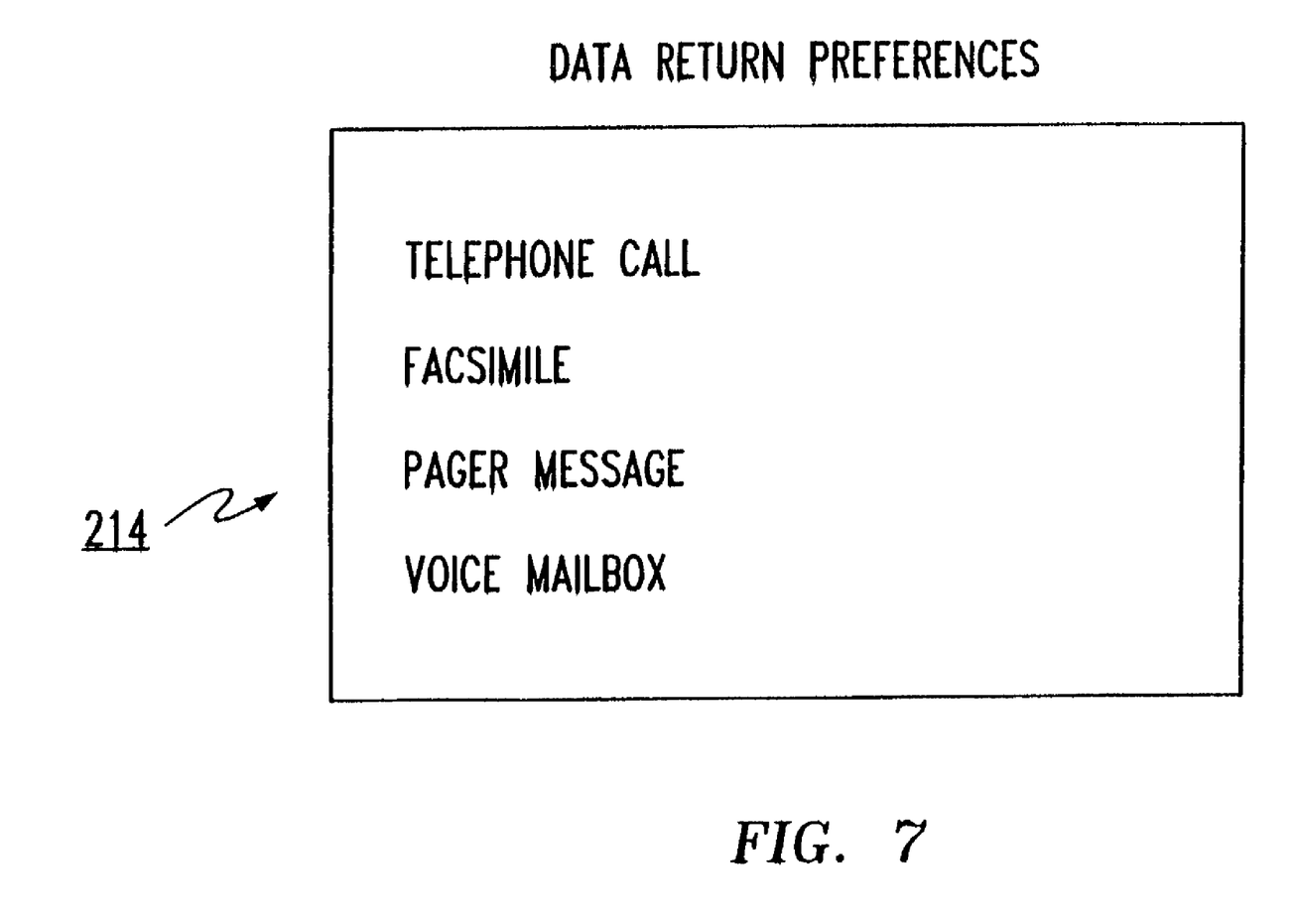
FIG. 7. shows data return parameters.

Some commands may not immediately return results. For example, if the user directed the network access device 102 to perform a search during a highly congested period of the network 106, the results of the search may take many seconds or minutes to complete. Thus, the user may choose for the network access device 102 to record the results of the search and either send the results to the user via a designated device such as a facsimile, for example, or alert the user via another designated device such as a phone in a call, or a pager sending a page message when the results are ready. Thus, as indicated in FIG. 2, the user may specify data return parameters 214 in the command result entry 208 of the profile to indicate which of the communication services subscribed by the user may be used and a priority order which the services are to be used to contact the user. FIG. 7 shows an example of the data return parameters 214 for the user where the user wishes to be contacted by telephone call first, then by facsimile, then by pager message, and last of all by a message in a voice mailbox using designated devices.

Figure 8:
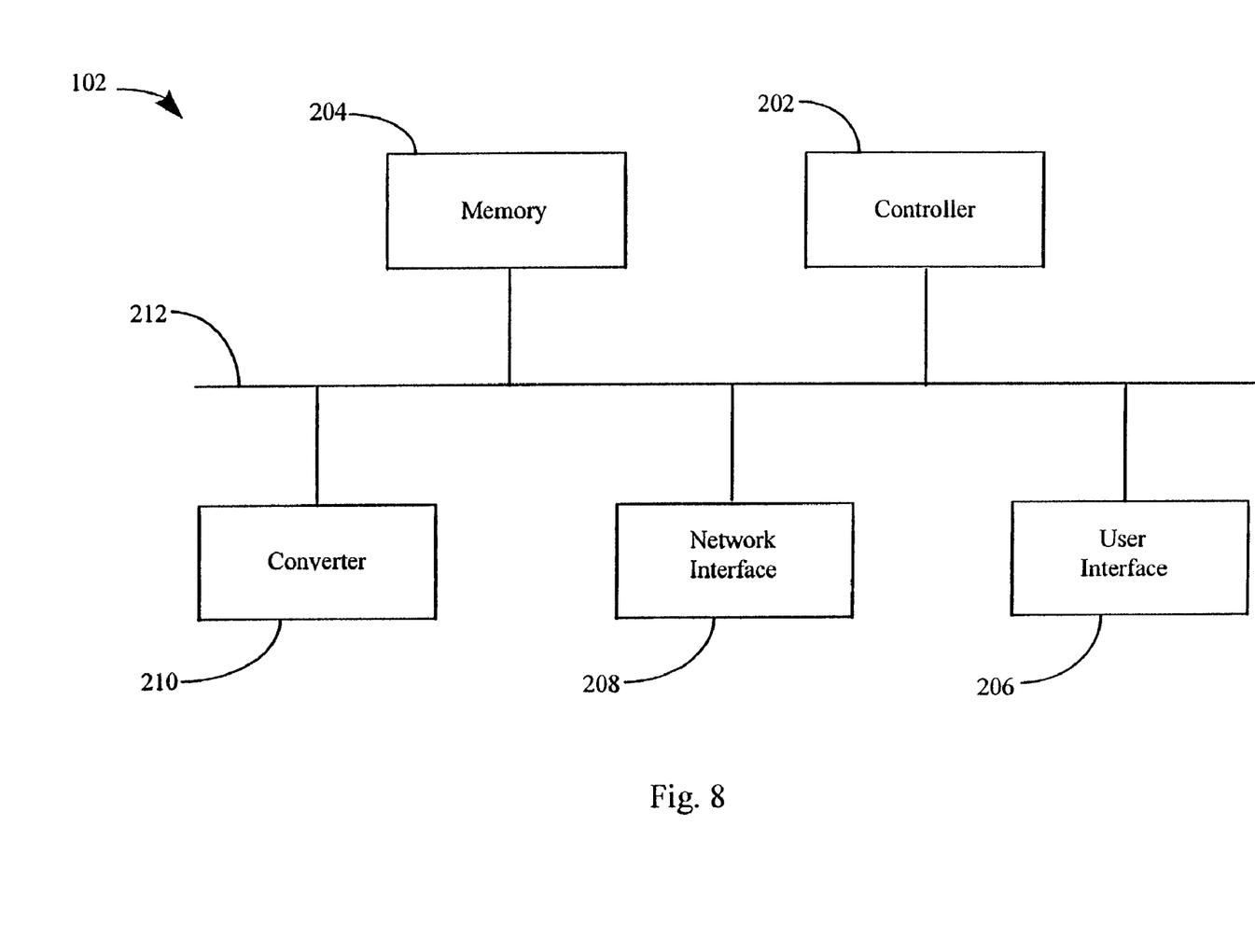
FIG. 8 shows a block diagram of a network access device.

FIG. 8 shows an exemplary block diagram of the network access device 102. The network access device 102 includes a controller 202, a memory 204, a user interface 206, a network interface 208 and a converter 210 that converts text to voice and voice to text in the case where voice communication devices are used. The above components are coupled together via signal bus 212. The architecture and components shown in FIG. 8 may be implemented using generally available components, applications specific integrated circuits (ASICs), PLAs or other hardware components. The architecture shown in FIG. 8 is only representative and other architectures such as connecting the memory 204 directly to the controller 202 are also possible.

When a user contacts the network access device 102, the contact is received through the user interface 206 and forwarded to the controller 202. The controller 202 interacts with the user to determine whether the user is a subscriber or not. If a subscriber, the controller 202 requests access identification from the subscriber. If not a subscriber, the controller 202 performs initial processing for non-subscribers such as requesting an account number to which the session should be billed and other messages such as basic default voice commands, etc. These messages may be bypassed for experienced non-subscribers by pressing "*" on a phone or by other methods of other types of devices, for example. After validating the requested access identification or billing information, the controller 202 loads a profile for the user from the memory 204 and then outputs an initial message to invite the user to begin by issuing a command.

When the command is received, the controller 202 executes the command and then determines whether the results of the command may be received immediately or a delay may be involved. If a delay may be involved, the controller 202 sets a timer for a short time. If the timer expires, the controller 202 queries the user whether the user desires to wait any longer for the results of the command or to obtain the results at a later time. If the user decides to receive the results at a later time, the controller 202 ends the session, collects the results as they arrive, stores the results in a database, for example, and reports the results to the user based on the data return parameters 214 in the user profile stored in the memory 204, for example. If the user decides to wait for the results of the command, the controller 202 reports the results to the user when received. As discussed above, the user may have specified in the user profile when to deliver any results of the commands. In such cases, a query to the user is unnecessary, and the controller 202 may directly perform the requested process as indicated in the user profile.

As indicated earlier, the user may use voice commands to direct the controller 202. A voice command may be received and transmitted by many types of devices including phones, PDAs, iTV with an audio interface, etc. After receiving the voice command, the controller 202 sends the voice command to the converter 210 to convert the voice command into text and then executes the commands via the network interface 208, for example. When the results of the command are received through the network interface 208, the controller 202 may send the results to the converter 210 to convert the results into voice and send the voice signals to the user through the network interface 208. Thus, the network access device 102 permits a user to use a communication device to access information on the network 106 and perform all the functions provided by the network 106.

FIG. 8 may represent the head-end 402 of a cable system shown in FIG. 13, for example. FIG. 8 may represent a network access devices of other network systems such as DSL, broadband, etc. The head-end 402 may gain access to information providers 404 accessible via the network 106 through the network interface 208. If users of the cable network desires to view a movie, for example, the head-end 402 may first determine if the movie is available in a database local to the head-end 402. If available, then the movie may be streamed to the user via the user interface 206. If not available, then the head-end 402 may locate a source for the movie and request that the movie be streamed from the source to the user at a later time. In situations where streaming from the source is not possible due to limited bandwidth, for example (as in the case of DSL), then the head-end may buffer the requested movie in a database and stream the movie to the user at a later time.

Other information providers such as advertising device 406 may also be accessible via the network 106. For example, advertisers may sponsor certain programs (e.g., movies, shows, etc.) and have advertising time during the course of the programs. The head-end 402 may overlay the movie or advertisements with selection icons to facilitate impulse buying, for example. If a user selects an item, the head-end 402 receives the selection via the user interface 206 as a request, for example, and may proceed to process the request by collecting information from the advertisers via the network 106 or proceed to interact with the user immediately. If the user has indicated in the user profile that delivery of information during a movie should be delayed or a transaction should be completed on the following Saturday mornings (for more sober consideration), for example, then the head-end 402 may delay delivery or complete the transaction based on the specifications in the user profile.

Figure 9:
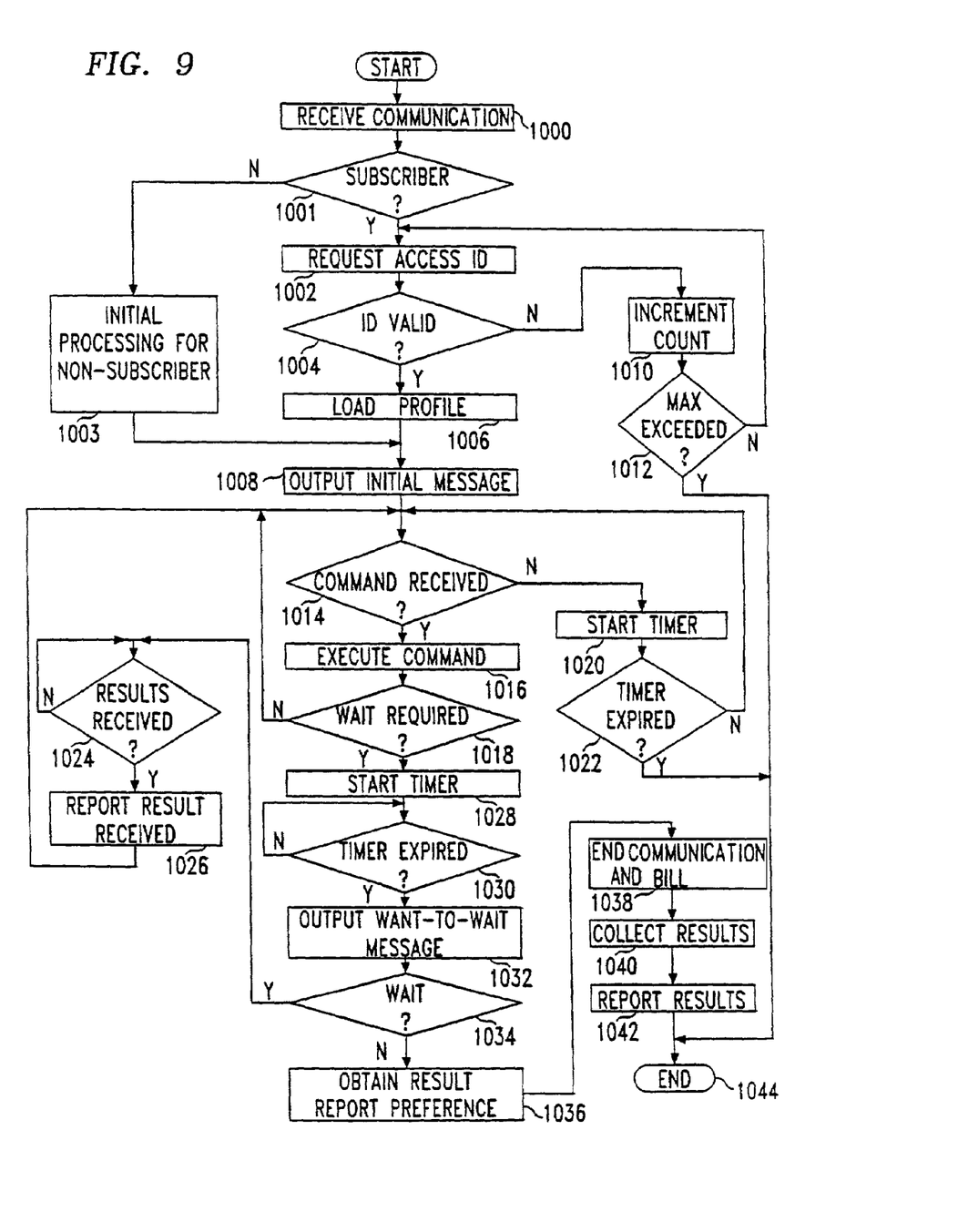
FIG. 9 shows a flowchart of a process of the network access device.

FIG. 9 shows a flowchart of a process of the controller 202. In step 1000, the controller 202 receives communication from the user and goes to step 1001. In step 1001, the controller 202 determines whether the user is a subscriber. If the user is a subscriber, the controller 202 goes to step 1002; otherwise, the controller goes to step 1003. In step 1003, the controller performs initial processing for non-subscribers and then goes to step 1008.

In step 1002, the controller 202 requests from the user the user access identification and goes to step 1004. The user access identification may be a password, a voice print of the caller and/or the MIN/ESN of a cellphone, for example. In step 1004, the controller 202 determines whether the access identification is valid. If valid, the controller 202 goes to step 1006; otherwise the controller 202 goes to step 1010. In step 1010, the controller 202 increments a count and goes to step 1012. In step 1012, the controller 202 determines whether a maximum count has been exceeded. If exceeded, the controller 202 goes to step 1044 and ends the session; otherwise, the controller 202 returns to step 1002. In step 1006, the controller 202 loads the subscriber profile and goes to step 1008.

In step 1008, the controller 202 outputs an initial message to invite the user to issue a command and goes to step 1014. In step 1014, the controller 202 determines whether the command has been received. If received, the controller 202 goes to step 1016; otherwise, the controller 202 goes to step 1020. In step 1020, the controller 202 starts a timer and goes to step 1022. In step 1022, the controller 202 determines whether the timer has expired. If expired, the controller 202 goes to step 1044; otherwise, the controller 202 returns to step 1014.

In step 1016, the controller 202 executes the received command and goes to step 1018. In step 1018, the controller 202 determines whether wait time is required before receiving the results of the command. If wait time is required, the controller 202 goes to step 1028; otherwise, the controller 202 returns to step 1014. In step 1028, the controller 202 starts a timer and goes to step 1030. In step 1030, the controller 202 determines whether the timer has expired. If expired, the controller 202 goes to step 1032; otherwise, the controller 202 returns to step 1030.

In step 1032, the controller 202 outputs a message to the user to query whether the user desires to wait for the results of the command and goes to step 1034. In step 1034, the controller 202 determines whether the user desires to wait. If the user desires to wait, the controller 202 goes to step 1024; otherwise, the controller 202 goes to step 1036. In step 1024, the controller 202 determines whether the results have been received. If received, the controller 202 goes to step 1026; otherwise, the controller 202 returns to step 1024. In step 1026, the controller 202 reports the results of the command to the user. If the results are in text, the controller 202 sends the results to the converter 210 to convert the text into voice or icon and sends it to the user. If the results include audio signals, the audio signals may be sent directly to the user. Then the controller 202 returns to step 1014.

In step 1036, the controller 202 obtains the data return parameters 214 from the profile and goes to step 1038. In step 1038, the controller 202 ends the communication and bills the user's account and goes to step 1040. The billing process may be performed later as details of specific circumstances may require. In step 1040, the controller 202 collects the results in a database, for example, and goes to step 1042. In step 1042, the controller 202 either informs the user that the results are available or reports the results to the user based on the instructions contained in the profile and goes to step 1044 and ends the process.

Figure 10:
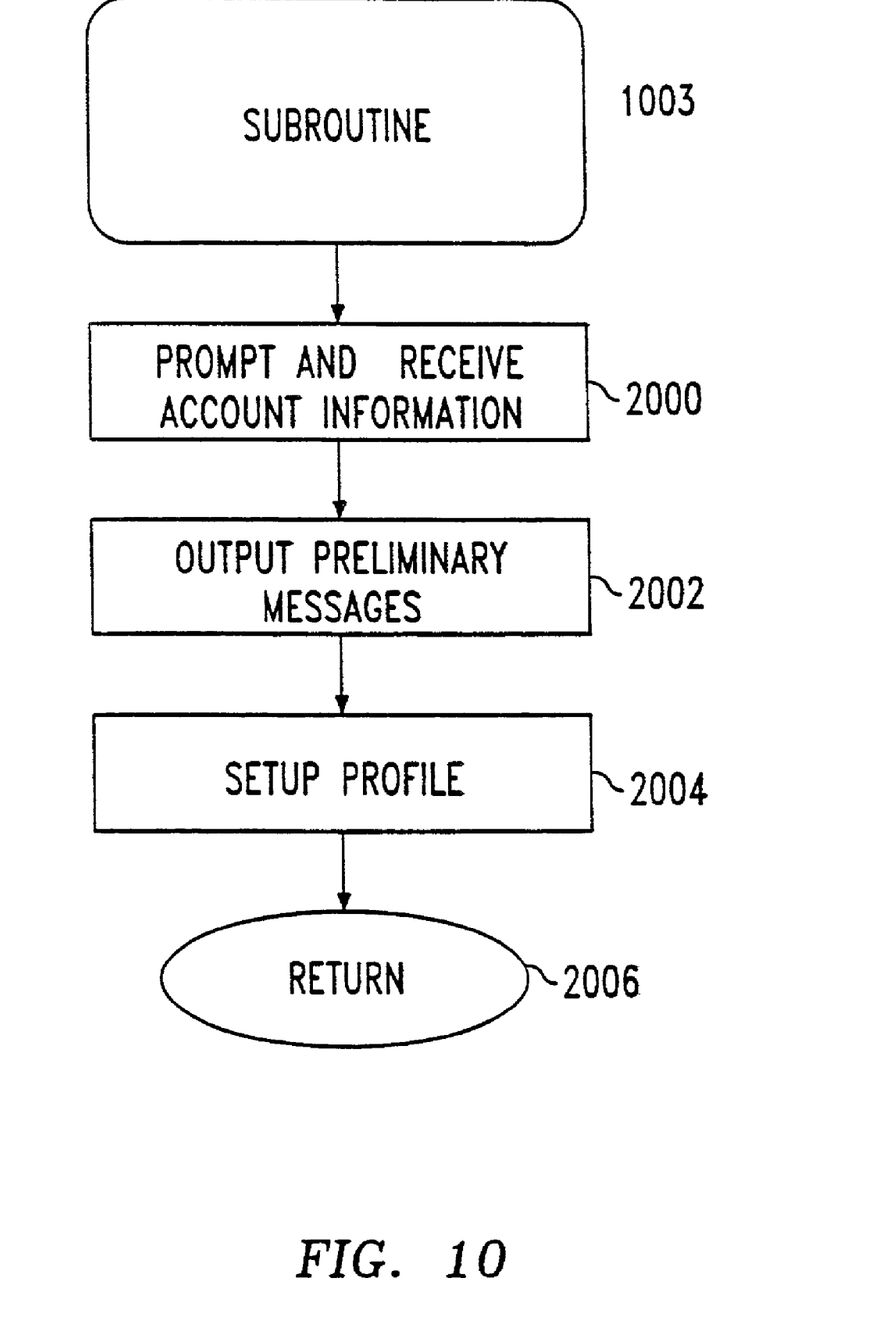
FIG. 10 shows a flowchart of a process for non-subscribers.

FIG. 10 shows a flowchart for a process of step 1003 as shown in FIG. 9. In step 2000, the controller 202 prompts and receives account information from the user and goes to step 2002. In step 2002, the controller 202 outputs preliminary messages to introduce the user to the network access system 100 and provides a summary of the various features and ground rules for operation so that the user may be familiarized with the service being offered. Such messages may be bypassed by the user if the user is a familiar user, for example. Then the controller 202 goes to step 2004 and sets up a profile for the user. This profile may be determined by interacting with the user or a default profile may be used. After the profile is determined, the controller 202 goes to step 2006 and returns control to step 1008 as shown in FIG. 9.

Figure 11:
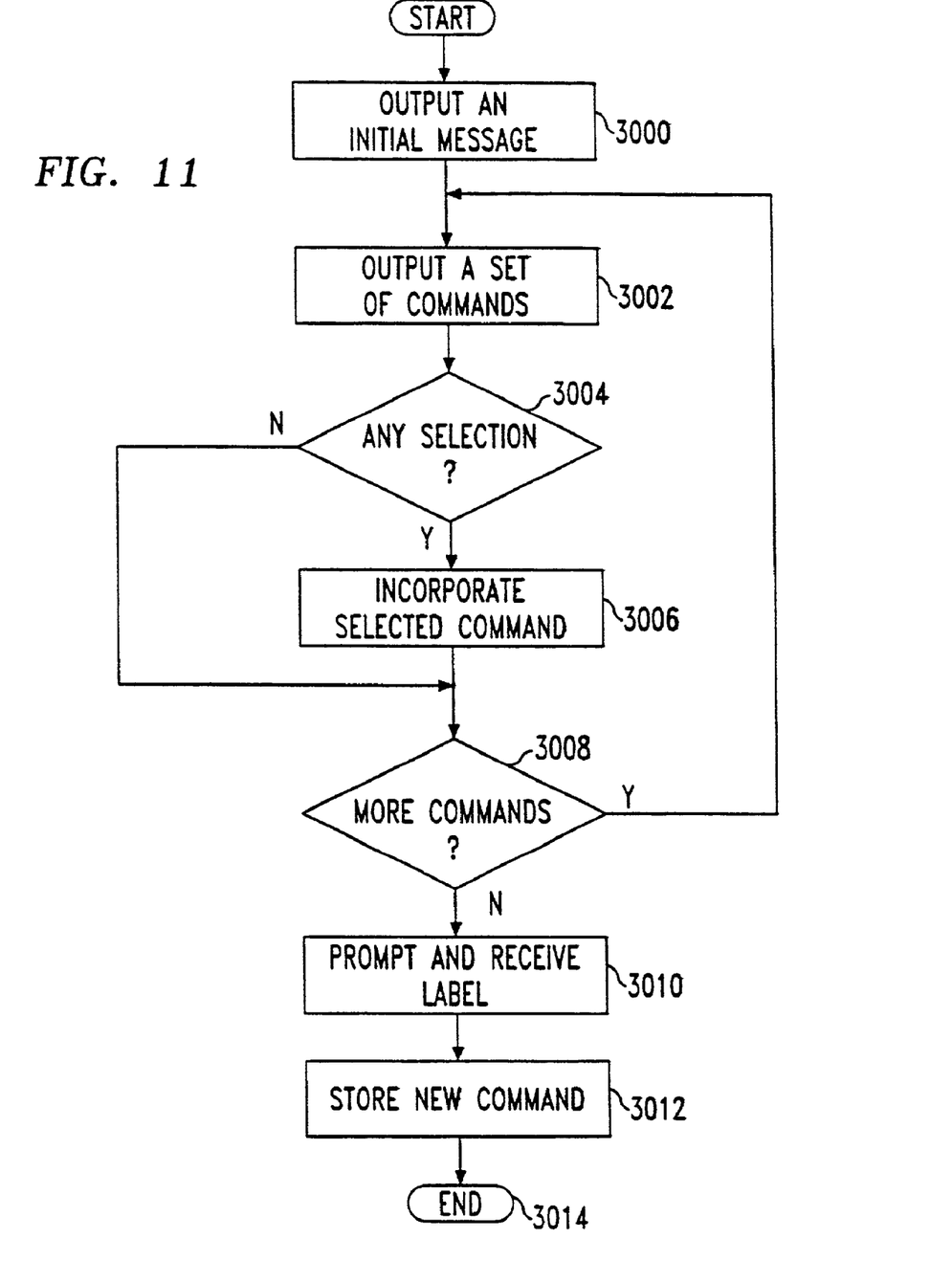
FIG. 11 shows a flowchart of a process to generate command macros.

FIG. 11 shows an exemplary flowchart of a process of the network device 102 to permit a user to generate new commands. In step 3000, the controller 202 outputs an initial message to the user and goes to step 3002. This message may include instructions on the new command generation procedure and how to select primitive commands and assign it to a label (i.e., either a voice label, and icon, or a text label such as "*3", for example). In step 3002, the controller 202 outputs primitive commands to the user. The primitive commands may be output to the user either individually or as sets of commands at one time with each of the primitive commands identified by a number, for example. Thus, the user may select any one of the primitive commands by merely identifying the number either by saying the number corresponding to the primitive command or pressing one of the numbered keys of a keypad of a telephone station, for example. After outputting the primitive commands, the controller 202 goes to step 3004. In step 3004, the controller 202 determines whether the user has selected any of the primitive commands output to the user. If the caller has selected a primitive command, the controller 202 goes to step 3006; otherwise, the controller 202 goes to step 3008. In step 3006, the controller 202 incorporates the selected command into the definition of a new command and goes to step 3008.

In step 3008, the controller 202 determines whether more primitive commands may be output to the user. If more primitive commands are to be output to the user, the controller 202 returns to step 3002, otherwise, the controller goes to step 3010. In step 3010, the controller 202 receives the label from the user and goes to step 3102. In step 3012, the controller 202 associates the label provided by the user with the new command generated by the above process and stores the new command in the command database and goes to step 3014 and ends the process.

Figure 12:
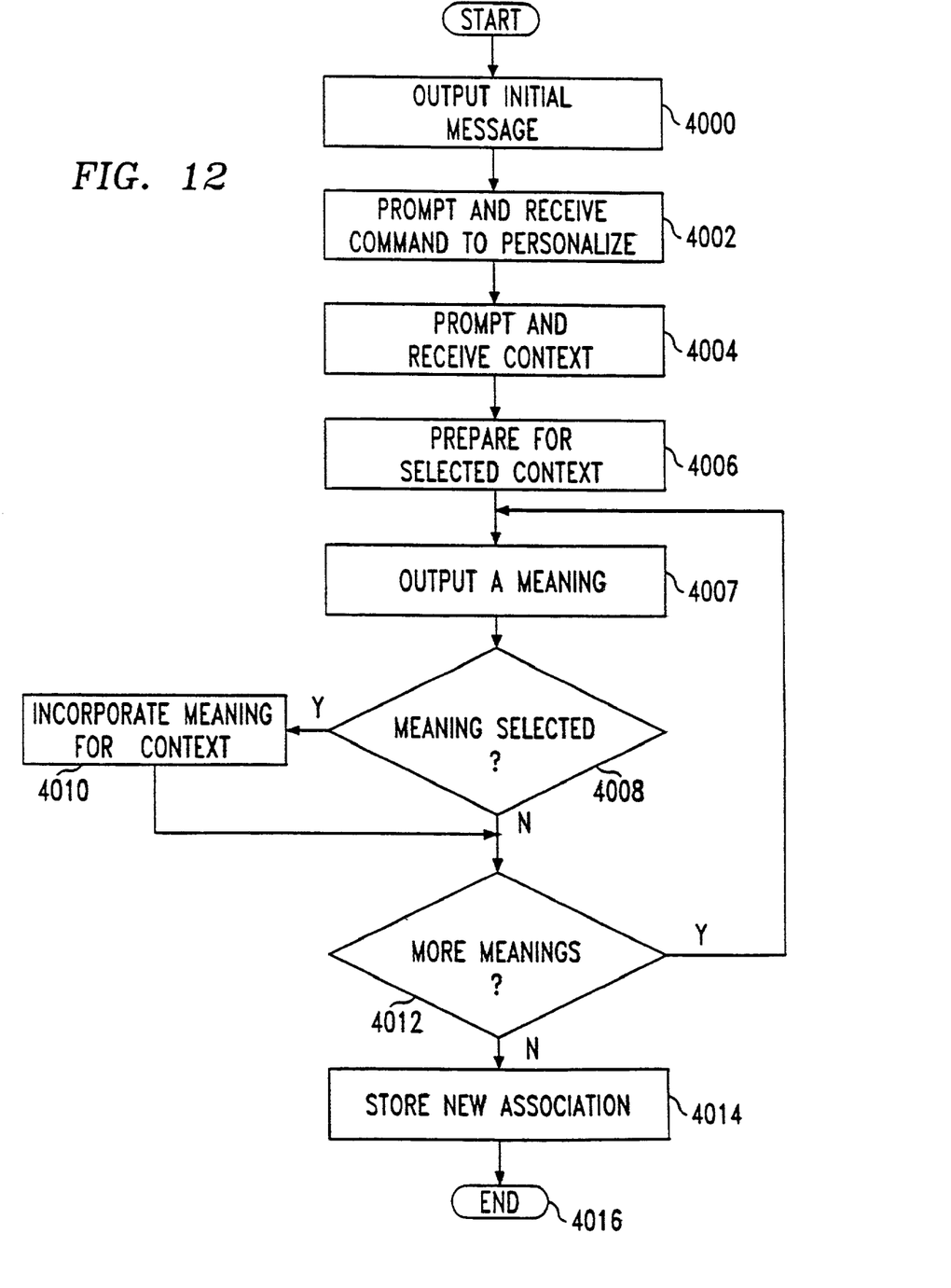
FIG. 12 shows a flowchart of a process to personalize a command for a selected context with selected meanings.

FIG. 12 shows an exemplary flowchart showing the process of the network device 102 for the user to personalize existing commands to tailor a command to a particular context having a particular meaning. In step 4000, the controller 202 outputs an initial message and goes to step 4002. Again, the initial message explains the personalization process and the type of information that may be required from the user, for example. In step 4002, the controller 202 prompts and receives from the user a request to personalize a selected command and goes to step 4004. In step 4004, the controller 202 outputs to the user a list of contexts that may be selected by the user for the selected command, and goes to step 4006. The controller 202 may output the contexts by speaking an identification or assigning and icon for each of the contexts associated with a number and the user may select one of the contexts by simply saying the number or pressing one of the numbered keys of the keypad of a telephone station, for example. In step 4006, the controller 202 prepares for the selected context and goes to step 4007. For example, the controller 202 may retrieve from a database all the possible meanings that may be associated with the selected command in the selected context.

In step 4007, the controller 202 outputs one meaning of a set of meanings associated with the selected command for the selected context and goes to step 4008. In step 4008, the controller 202 determines whether the user selected the meaning that was output to the user. If the meaning was selected, the controller 202 goes to step 4010; otherwise, the controller goes to step 4012. In step 4010, the controller 202 incorporates the selected meaning into the selected command for the selected context and goes to step 4012. In step 4012, the controller 202 determines whether more meanings may be output to the user. If more meanings remain, the controller 202 returns to step 4007, otherwise, the controller 202 goes to step 4014. In step 4014, the controller 202 stores the new association of the selected command with the newly incorporated meaning for the selected context and goes to step 4016 and ends the process.

While this invention has been described in conjunction with specific embodiments thereof, it is evident that many alternatives, modifications and variations will be apparent to those skilled in the art. Accordingly, preferred embodiments of the invention as set forth herein are intended to be illustrative and not limiting. Various changes may be made without departing from the spirit and scope of the invention.

What is claimed is:

1. A method for accessing a network through a communication device, comprising:
receiving a contact from the communication device;
accessing the network based on commands received from the contact; and
determining, based on a data return parameter in a user profile, the data return parameter including at least a parameter that indicates whether to deliver results of the commands immediately or at a later time when the results become available;
collecting portions of the results in a memory if results are to be delivered at a later time; and
delivering the results to the communication device.

2. The method of claim 1, further comprising:
receiving the commands from the communication device;
translating the commands into a function that is to be performed; and
performing the function.

3. The method of claim 2, wherein the commands include at least one of a voice command, a keypad command or an icon selection.

4. The method of claim 2, wherein the function comprises at least one of:
setting up a log-on ID on the network;
logging on to the network;
accessing pages reachable through the network;
sending e-mail through the network;
retrieving e-mail received through the network;
searching the network;
chatting on the network;
sending messages to a forum on the network;
downloading from the network;
streaming information to a designated device;
sending information related to an item displayed by the communication device;
bidding in an auction; or
retrieving information based on a shopping input.

5. The method of claim 1, further comprising generating an alert when all portions of the results are collected, the alert being at least one of initiating a telephone call, sending a message to a pager, sending a facsimile to a designated facsimile number, leaving a voicemail in a voicemail box and displaying a display of the communication device.

6. The method of claim 1, wherein the delivering comprises at least one of:
outputting the results to the communication device;
outputting the results to a communication device other than the communication device;
sending a facsimile containing the results to a designated facsimile number;
mailing a copy of the results;
streaming the results to a designated device; and
downloading result to a database and then outputting the results to the designated device.

7. The method of claim 1, wherein the communication device includes one or more of:
a wireless phone;
a wireless internet protocol device;
an I-mode device;
a personal digital assistant;
an iTV;
a wireless radio;
a land line phone;
a set-top box;
a home gateway; and
a wireless internet device.

8. A network access device, comprising:
a network interface;
a user interface;
a memory; and
a controller coupled to the network interface and the memory, the controller receiving a contact from a communication device through the user interface, accessing the network based on commands received from the communication device, wherein the controller determines, based on a data return parameter in a user profile, the data return parameter including at least a parameter that indicates whether to deliver results of the commands immediately or at a later time, collects portions of the results in a memory if the results are to be delivered at a later time, and delivers the results to the contact.

9. The device of claim 8, wherein the controller receives the commands from the communication device, translates the commands into a function that is to be performed, and performs the function.

10. The device of claim 9, wherein the commands include at least one of a voice command, a keypad command, or an icon selection.

11. The device of claim 9, wherein the function comprises at least one of:
setting up a log-on ID on the network;
logging onto the network;
accessing pages reachable through the network;
sending e-mail through the network;
retrieving e-mail received through the network;
searching the network;
chatting on the network;
sending messages to a forum on the network;
downloading information from the network;
sending information related to an item displayed by the communication device;
streaming information to a designated device;
bidding in an auction; or
retrieving information based on a shopping input.

12. The device of claim 8, wherein the controller generates an alert when all portions of the results are collected, the alert being at least one of initiating a telephone call, sending a message to a pager, sending a facsimile to a designated facsimile number, leaving a voicemail in a voicemail box, and displaying a display of the communication device.

13. The device of claim 8, wherein the controller at least one of:
outputs the results to the communication device;
outputs the results to a communication device other than the communicating device;
sends a facsimile containing the results to a designated facsimile number;
mails a copy of the results;
streams the results to a designated device; and
downloads result to a database and then outputting the results to the designated device.

14. The device of claim 8, wherein the communication device includes one or more of:
a wireless phone;
a personal digital assistant;
an iTV;
a wireless radio;
a landline phone;
a set-top box;
a home gateway; and
a wireless internet device.

15. The device of claim 8, wherein the network access device is a head-end of a cable system or a controller for a Digital Subscriber Line network, a controller for a broadband network.

* * * * *